(12) United States Patent
Kinch et al.

(10) Patent No.: US 12,408,576 B2
(45) Date of Patent: Sep. 9, 2025

(54) AUTONOMOUS FOLDING FARM IMPLEMENT AND METHOD

(71) Applicant: Mojow Autonomous Solutions Inc., White (CA)

(72) Inventors: Owen Kinch, White (CA); Mojtaba Hedayatpour, Edmonton (CA)

(73) Assignee: MOJOW AUTONOMOUS SOLUTIONS INC., White (CA)

( * ) Notice: Subject to any disclaimer, the term of this patent is extended or adjusted under 35 U.S.C. 154(b) by 656 days.

(21) Appl. No.: 17/497,873

(22) Filed: Oct. 8, 2021

(65) Prior Publication Data
US 2022/0124959 A1    Apr. 28, 2022

Related U.S. Application Data

(60) Provisional application No. 63/106,780, filed on Oct. 28, 2020.

(51) Int. Cl.
*A01B 73/06* (2006.01)
*A01B 76/00* (2006.01)

(52) U.S. Cl.
CPC ........... *A01B 73/067* (2013.01); *A01B 76/00* (2013.01)

(58) Field of Classification Search
CPC ....... A01B 73/067; A01B 76/00; A01B 63/32; A01B 73/02; G05B 11/42; G05B 19/045; G05B 19/46; G05D 1/02
See application file for complete search history.

(56) References Cited

U.S. PATENT DOCUMENTS

| | | | |
|---|---|---|---|
| 8,833,481 B2 * | 9/2014 | Blunier | A01B 63/008 701/50 |
| 9,063,530 B2 * | 6/2015 | Lougheed | G05B 19/04 |
| 9,706,701 B2 * | 7/2017 | Prickel | A01C 7/208 |
| 9,795,074 B2 | 10/2017 | Stratton et al. | |
| 10,015,360 B1 | 7/2018 | Kurzhanskiy et al. | |
| 10,078,890 B1 | 9/2018 | Tagestad et al. | |
| 10,089,554 B1 | 10/2018 | Chartrand | |
| 10,331,980 B1 | 6/2019 | Chartrand | |
| 10,368,475 B2 | 8/2019 | Wolters et al. | |
| 10,390,472 B2 | 8/2019 | Matthews | |
| 10,595,460 B1 | 3/2020 | Davis et al. | |
| 10,664,702 B2 | 5/2020 | Albrecht et al. | |

(Continued)

*Primary Examiner* — Aniss Chad
*Assistant Examiner* — Christopher George Fees
(74) *Attorney, Agent, or Firm* — Husch Blackwell

(57) ABSTRACT

There is provided an autonomous system for farm implements having a sensor system, an interface to send control signals to a power platform coupled to the farm implement, and a processing structure executing instructions. The instructions involve capturing initial sensor data from the sensor system; estimating a pose of the farm implement from the initial sensor data; generating a fold/unfold trajectory for the power platform in order to fold or unfold the farm implement; instructing the power platform using the interface to travel along the fold/unfold trajectory; receiving additional sensor data from the sensor system as the power platform travels along the fold/unfold trajectory; instructing the power platform using the interface to make adjustments to the fold/unfold trajectory based on the additional sensor data; and stopping the power platform once the farm implement reaches a folded position or an unfolded position.

23 Claims, 12 Drawing Sheets

(56) References Cited

U.S. PATENT DOCUMENTS

| | | | |
|---|---|---|---|
| 10,721,859 B2* | 7/2020 | Wu | A01C 21/005 |
| 10,795,351 B2* | 10/2020 | Hurd | H04W 4/40 |
| 10,795,372 B2 | 10/2020 | Runde et al. | |
| 10,885,331 B2 | 1/2021 | Guo et al. | |
| 10,912,247 B2 | 2/2021 | Wolters et al. | |
| 10,963,825 B2 | 3/2021 | Tatge et al. | |
| 2013/0233580 A1* | 9/2013 | Kinzenbaw | A01B 73/065 172/1 |
| 2017/0010619 A1* | 1/2017 | Foster | B60T 7/00 |
| 2017/0354078 A1* | 12/2017 | Foster | A01B 69/00 |
| 2018/0321683 A1* | 11/2018 | Foster | G05D 1/0221 |
| 2018/0359906 A1* | 12/2018 | Foster | G05D 1/0223 |
| 2019/0014723 A1* | 1/2019 | Stanhope | A01B 73/065 |
| 2019/0124822 A1* | 5/2019 | Czapka | A01B 76/00 |
| 2019/0212316 A1 | 7/2019 | Sutton | |
| 2019/0338809 A1* | 11/2019 | Clark | A01B 59/00 |
| 2020/0049514 A1 | 2/2020 | Grandl et al. | |
| 2020/0272971 A1 | 8/2020 | Ruff et al. | |
| 2020/0281133 A1 | 9/2020 | Rowan et al. | |
| 2021/0150207 A1 | 5/2021 | Guo et al. | |
| 2021/0372441 A1* | 12/2021 | Kale | G05B 19/4155 |

\* cited by examiner

AUTONOMOUS FOLDING FARM IMPLEMENT AND METHOD

PRIORITY CLAIM

The present application claims priority to U.S. Provisional Application Ser. No. 63/106,780 filed Oct. 28, 2020 and entitled, "AUTONOMOUS FOLDING FARM IMPLEMENT AND METHOD", which is hereby incorporated by reference in its entirety.

FIELD OF THE INVENTION

This invention is in the field of farm implements and in particular to autonomous farm implements.

BACKGROUND

Over the past 100 years, farm implements have grown in size and many of the implements have been designed to fold in order to facilitate transport to and from the fields as well as improve storage of the implement.

SUMMARY OF THE INVENTION

The invention may comprise one or more of any and/or all aspects described herein in any and/or all combinations.

There is provided herein, an autonomous system for a farm implement that may comprise: a sensor system; a control interface to send control signals to a power platform coupled to the farm implement; and a processing structure executing instructions from a tangible computer-readable memory. The instructions may comprise: capturing sensor data from the sensor system; estimating a pose of the farm implement from the sensor data; generating a plan for the power platform in order to fold or unfold the farm implement; instructing the power platform using the interface to travel along the plan; continue receiving sensor data from the sensor system as the power platform travels along the plan; instructing the power platform using the interface to make adjustments to the plan based on the sensor data; and stopping the power platform once the farm implement reaches a folded position or an unfolded position.

The sensor system may have one or more of: a magnetometer, an image sensor, a range sensor, an inertial sensor, a digital switch, an analog potentiometer, a linear position sensor, a rotary position sensor, and any combination thereof. The range sensor may be selected from at least one of: a light detection and ranging (LiDAR) sensor, a radio detection and ranging (radar) sensor, a sound navigation and ranging (sonar) sensor, microphones, and a pair of cameras. The image sensor may have a field of view that encompasses the farm implement.

The processing structure may have one or more of: a general purpose processor, a digital signal processor (DSP), an artificial neural network (ANN), a graphics processing unit (GPU), a field programmable gate array (FPGA), and any combination thereof.

The instructions may further comprise: determining a power platform axis and an implement axis; generating an alignment trajectory to generally align the power platform axis with the implement axis; and instructing the power platform to travel along the alignment trajectory.

The instructions may further comprise: determining at least one obstacle within the initial sensor data; generating an obstacle avoiding trajectory; and instructing the power platform to travel along the obstacle avoiding trajectory. The pose estimation may comprise: determining an initial relative position and orientation of at least one wing of the farm implement.

The instructions may further comprise: sending at least one unlock signal to the power platform to unlock one of the at least one wing of the farm implement prior to the power platform traveling along the fold/unfold trajectory; and sending a direction signal to a direction switch to control a direction of an actuator associated with the one or the at least one wing. The instructions may further comprise: determining a wing angle of the at least one wing of the farm implement from the sensor data; and stopping the power platform once the wing angle corresponds to a full operation angle or a fully folded angle. The instructions may further comprise: sending a locking signal to the at least one wing to lock the at least one wing of the farm implement in an operation position or a transport position.

The farm implement may fold/unfold symmetrically or fold/unfold asymmetrically.

There is provided herein an autonomous method for unfolding/folding a farm implement. The method may comprise: capturing sensor data from a sensor system; estimating a pose of the farm implement from the sensor data; generating a fold/unfold plan for a power platform and the farm implement; generating a fold/unfold trajectory for a power platform in order to fold or unfold the farm implement; instructing the power platform using a control interface for the power platform to travel along the fold/unfold trajectory; continue receiving sensor data from the sensor system as the power platform travels along the fold/unfold trajectory; instructing the power platform using the control interface to make at least one adjustment to the fold/unfold trajectory based on the sensor data; and stopping the power platform once the farm implement reaches a folded position or an unfolded position.

The autonomous method may further comprise: detecting the farm implement and estimating at least one boundary. The at least one boundary may be estimated by at least one of: a feature descriptor extraction, a deep learning process, a supervised deep learning process, a motion measurement, an optical flow, a map building, a linear optimization, and a nonlinear optimization.

The autonomous method may further comprise: estimating at least one state of the power platform, the farm implement, and a combination thereof. The at least one state is determined by at least one of: a geometric process, a Kalman filter, a linear optimization, a nonlinear optimization, and a moving horizon estimation.

The autonomous method may further comprise: generating the fold/unfold trajectory with at least one of: a common trajectory planning, a graph-based search, a search over a configuration space, a grid-based search, an interval-based search, a geometric process, an artificial potential field, a sampling-based process, a linear optimization, a nonlinear optimization, and a probabilistic roadmap.

The autonomous method may further comprise: determining the at least one adjustment with at least one of: a Proportional-Derivative-Integral (PID), a Model Predictive Control (MPC), a linear control process, a nonlinear control process, a deep learning process, and a reinforcement learning-based process.

The autonomous method may further comprise: determining a type of the farm implement based on the sensor data. The autonomous method may further comprise: training a machine learning process using at least one of: the sensor data, an operator input, system inputs, and system outputs to determine the type of the farm implement.

The autonomous method may further comprise: mapping an environment for tracking and localization of at least one of: the farm implement, the power platform, and any obstacle within the environment.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION

A power platform 300 may provide one or more functions for a farm implement 102, 602 such as a motive force to propel the implement in an arbitrary (e.g. forward, sideways or backward) direction, an electrical power supply, and/or a pressurized hydraulic fluid. In the aspect described herein, the power platform 300 may comprise a traditional tractor that pulls one or more implements behind. In some other aspects, the power platform 300 may comprise a tractor-like vehicle that moves one or more implements from front or underneath. In some aspects, the power platform 300 may comprise one or more actuators (electric and/or hydraulic). In some other aspects, the power platform 300 may be equipped with one or more sensors such as GPS, camera, light detection and ranging (LiDAR), radio detection and ranging (Radar), sound navigation and ranging (Sonar), inertial measurement unit (IMU), microphones, magnetometer and optical and/or magnetic encoders.

An autonomous controller 1700, described in further detail with reference to FIG. 17 below, may be integrated with the power platform 300 to form an autonomous power platform. In some aspects, the autonomous controller 1700 may be a separate unit that may be coupled to an existing power platform 300 or in other aspects, the autonomous controller 1700 may be built into the power platform 300. In even other aspects, the autonomous controller 1700 may be coupled to an existing implement 102, 602 or integrated with the implement 102, 602. The autonomous power platform 300 may provide one or more communication channels, such as a wired or wireless communication channel, between the implement 102, 602 and the power platform 300 where one may not have previously existed. In some aspects, the implement 102, 602 may not have an electronic control unit (ECU). In some aspects, the autonomous controller 1700 and/or parts of its software and/or hardware may be hosted offsite, remotely, and/or in the cloud.

Figure 1:
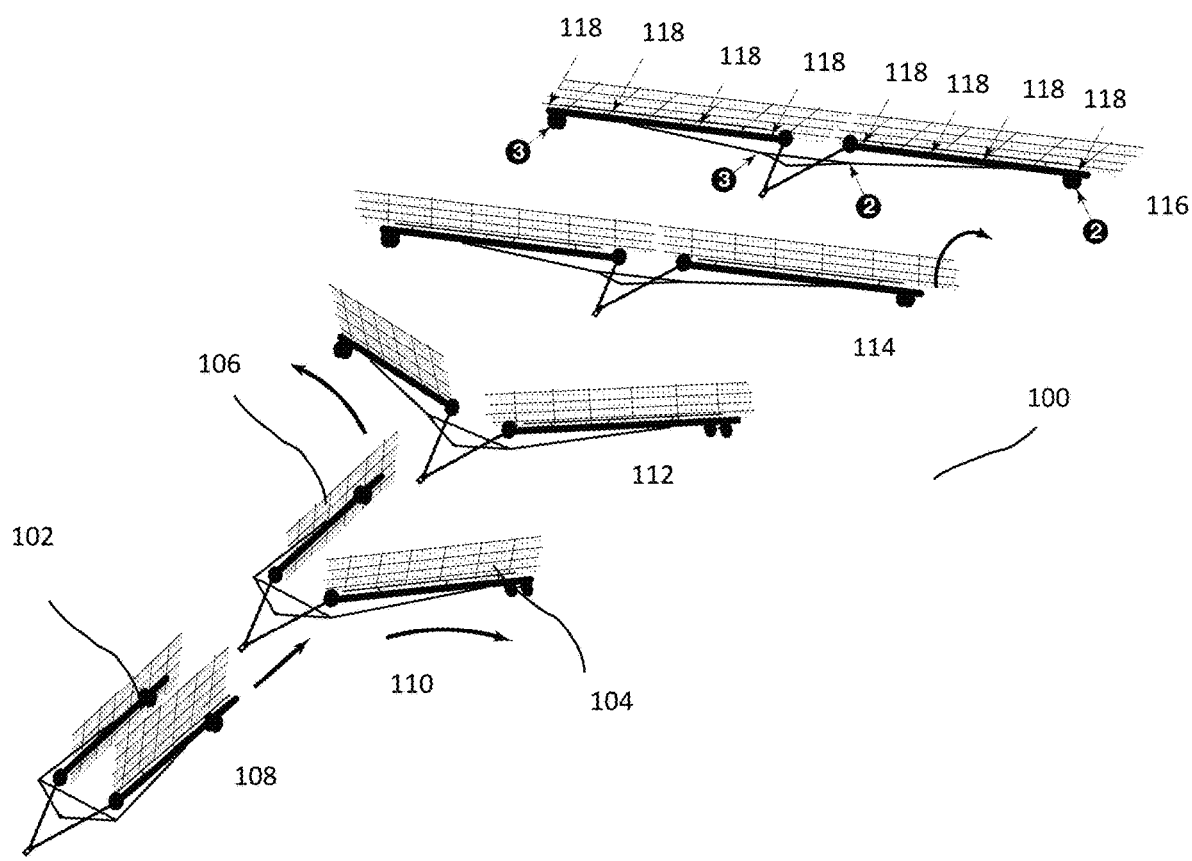
FIG. 1 is a perspective top view of a folding heavy harrow demonstrating an unfolding procedure.

With reference to FIG. 1, an unfolding process 100 for a heavy harrow 102 is shown. The heavy harrow 102 may comprise a left wing 104 and a right wing 106. The unfolding process 100 starts with the heavy harrow 102 in a transport (or storage) position 108 having the left wing 104 and the right wing 106 folded together. As shown in position 110, the left wing 104 may be rotated away from the right wing 106 from between 45-degrees to 90-degrees in order to avoid contact or damage with the right wing 106 before moving the right wing 106. At position 112, the right wing 106 may then be rotated from the transport position. At position 114, the right wing 106 and the left wing 104 may be fully unfolded. Finally, at position 116, one or more harrow tines 118 may be rotated or pivot down into an in-use position. Although FIG. 1 shows the left wing 104 being unfolded before the right wing 106, in other aspects, the right wing 106 may be unfolded before the left wing 104 at position 110. In even other aspects, the right wing 106 and the left wing 104 may be unfolded together.

Figure 2:
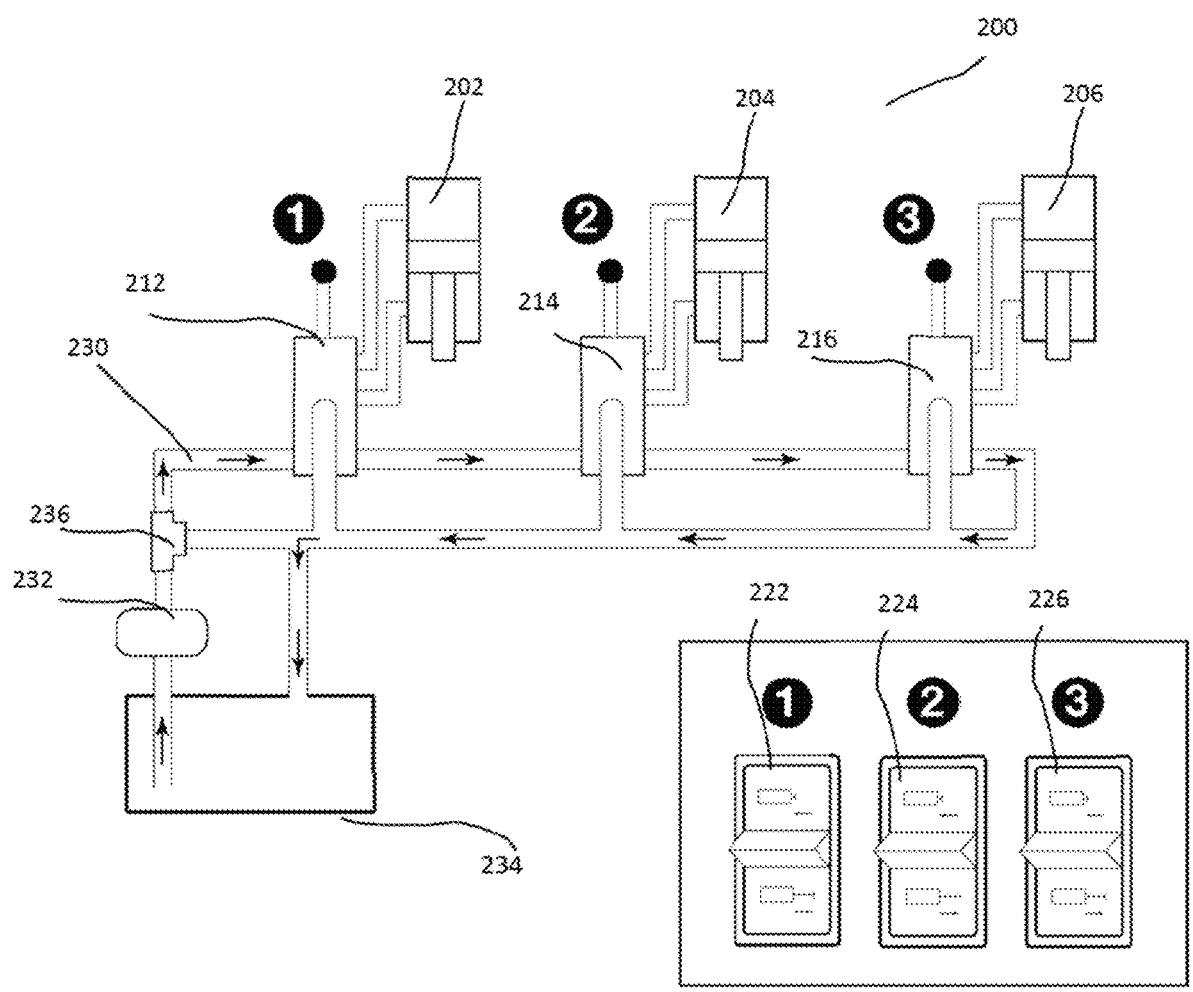
FIG. 2 is a conceptual diagram of one or more remote connections between an autonomous power platform and the heavy harrow.

Turning to FIG. 2, a hydraulic system 200 may connect the autonomous power platform 300 to the heavy harrow 102. In this aspect, the hydraulic system 200 may comprise a plurality of hydraulic cylinders, such as a harrow lift cylinder 202, a left wing cylinder 204, and/or a right wing cylinder 206. Other aspects may use an electrical and/or a pneumatic actuator rather than or in addition to hydraulic cylinders. An actuator 212, 214, 216, such as direction control valve, may be associated with each cylinder 202, 204, 206 and may control the direction of motion of each of their respective cylinders 202, 204, 206. A direction switch 222, 224, 226 may be associated with each direction control valve 212, 214, 216. In this aspect, physical direction switches 222, 224, 226 are depicted. In other aspects, the switches 222, 224, 226 may be controlled by the autonomous controller 1700. The autonomous controller 1700 may control the switches 222, 224, 226 in order to effect a folding and/or an unfolding procedure as described in further detail below. Hydraulic fluid may flow through a hydraulic circuit 230 and may provide the hydraulic fluid to each of the direction control valves 212. Pressure within the hydraulic circuit 230 may be maintained using a pump 232 that may pump the hydraulic fluid from a reservoir 234. A relief valve 236 may prevent excessive pressure in the hydraulic circuit 230.

Figure 17:
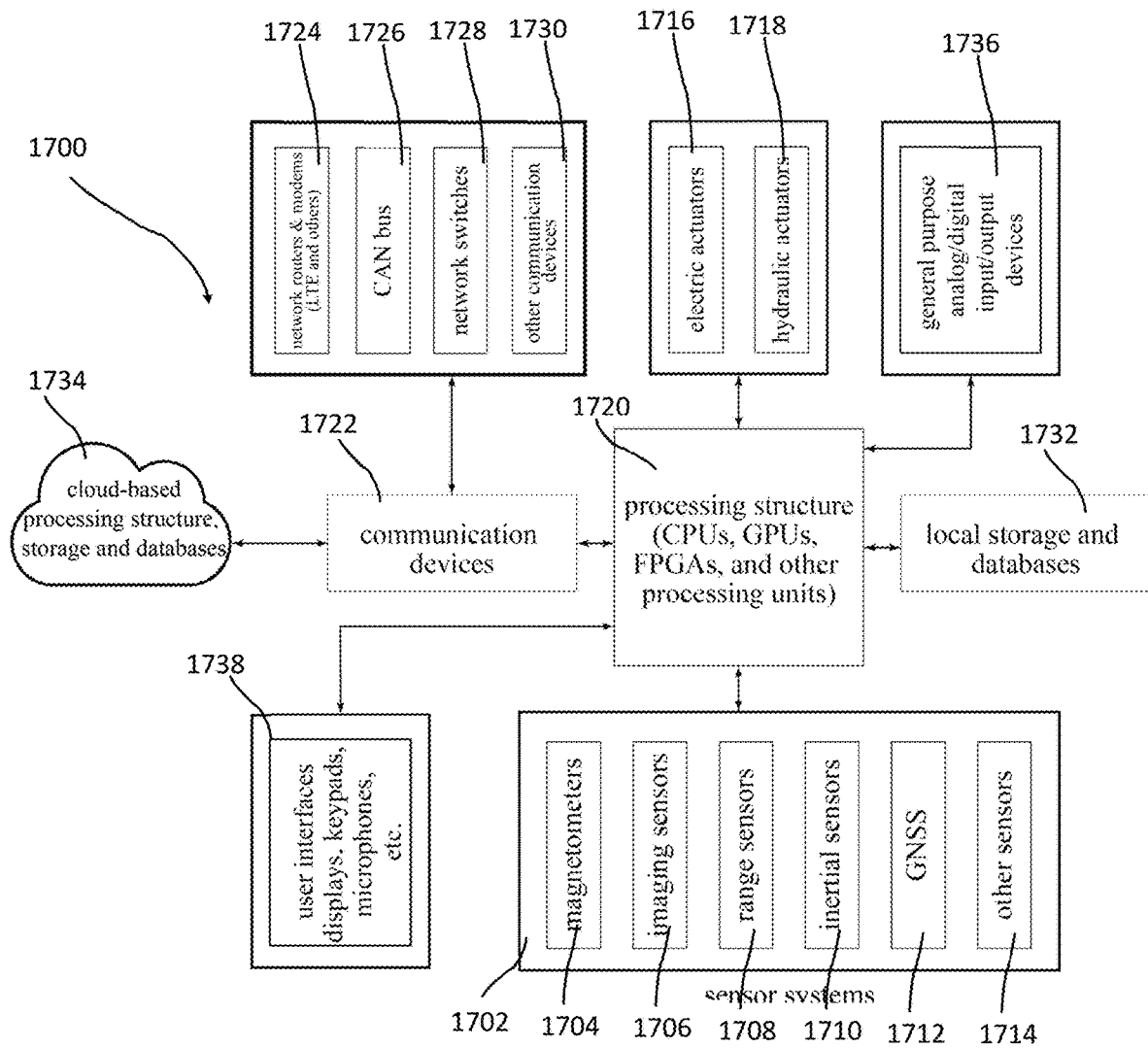
FIG. 17 is a block diagram of the autonomous controller.

Turning to FIG. 17, the autonomous controller 1700 may comprise one or more sensor systems 1702. The one or more sensor systems 1702 may comprise one or more sensors, such as magnetometers 1704, imaging sensors 1706 (e.g. cameras), range sensors 1708 (e.g. light detection and ranging (LiDAR), radio detection and ranging (radar), sound navigation and ranging (sonar)), inertial sensors 1710 (inertial measurement unit (IMU)), GNSS/GPS 1712, optical and/or magnetic rotary encoders, optical and/or magnetic linear position sensors, and/or other sensors 1714 (e.g. microphones, digital switches, and/or analog potentiometers). In this aspect, one or more imaging sensors 1706 (e.g. cameras) and/or one or more range sensors may have associated fields of view of the heavy harrow 102. The imaging sensors 1706 may have a field of view looking towards a direction of travel.

The sensor systems 1702 may provide sensor data to a processing structure 1720. The processing structure 1720 may comprise one or more of: a general purpose processor, a digital signal processor (DSP), an artificial neural network, a graphics processing unit (GPU), a Field Programmable Gate Arrays (FPGA), and/or a combination thereof. In some aspects, the processing structure 1720 may be located in an offsite location (e.g., a cloud-based computer). The processing structure 1720 may comprise a processor (single or multicore) and associated support circuitry (e.g. clock, etc.). In some aspects, the autonomous controller 1700 may comprise one or more communication devices 1722 such as network routers 1724 with LTE® networks, 3G, 4G® networks and 5G support, CAN bus 1726, network switches 1728, and/or other communication devices 1730. The processing structure 1720 may also have one or more general purpose input/output ports 1736 that may be digital or analog. The processing structure 1720 may control one or more flow control valves, electric actuators 1716 and/or hydraulic actuators 1718. The processing structure 1720 may display a user interface 1738 on a display and/or speak to a user through a speaker or headphone and may accept user input via a touch system, keypads, microphones, and/or other input device. The user interface 1738 may be located local to the autonomous controller 1700 or may be provided at a remote location, such as through a website.

In some aspects, the autonomous controller 1700 may comprise one or more storage and memory devices 1732, such as one or more database systems, to store and manage sensor data. The one or more storage and memory devices 1732 may store a plurality of instructions for execution by the processing structure 1720 as described in more detail herein. The one or more database systems may be hosted in a cloud-based storage and database 1734. In some aspects, one or more portions of the processing structure 1720 may be hosted in a cloud-based or remote processing structure 1734.

The processing structure 1720 may store one or more images and/or other sensor data into memory 1732 and may process the images and/or other sensor data. The processing structure 1720 may have a control interface for sending control signals to the direction control valves 212, 214, 216 in order to fold or unfold the heavy harrow 102 as described in further detail below.

Figure 3:
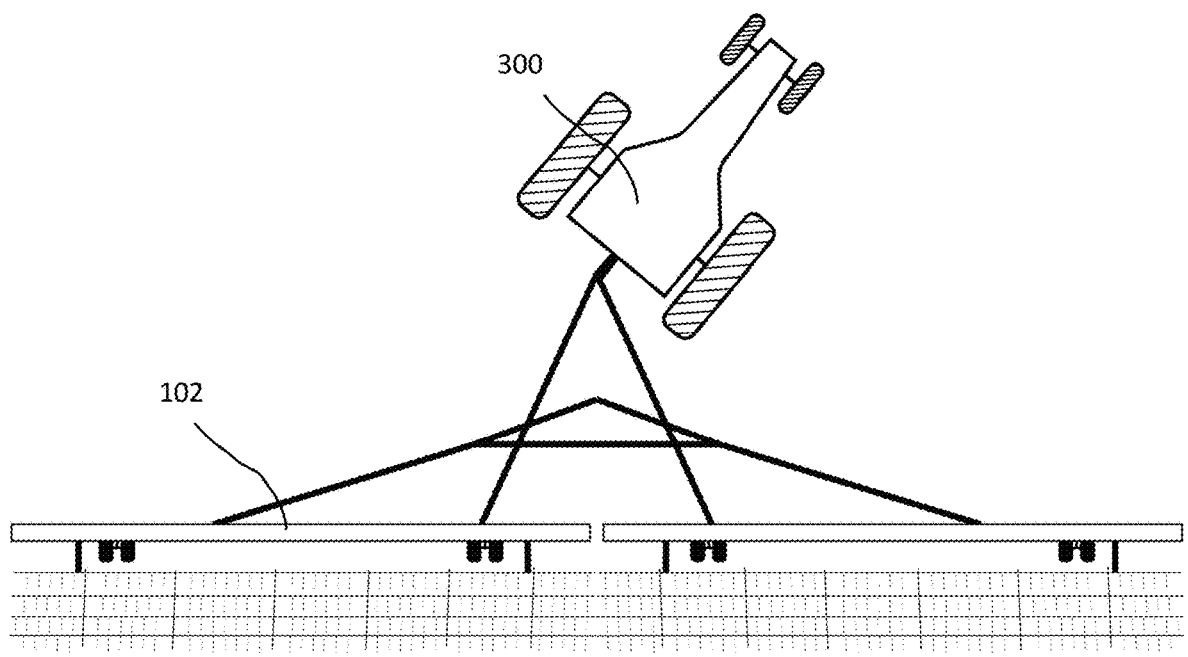
FIG. 3 is a top view of a tractor and the heavy harrow demonstrating an incorrect relative position and orientation.
Figure 4:
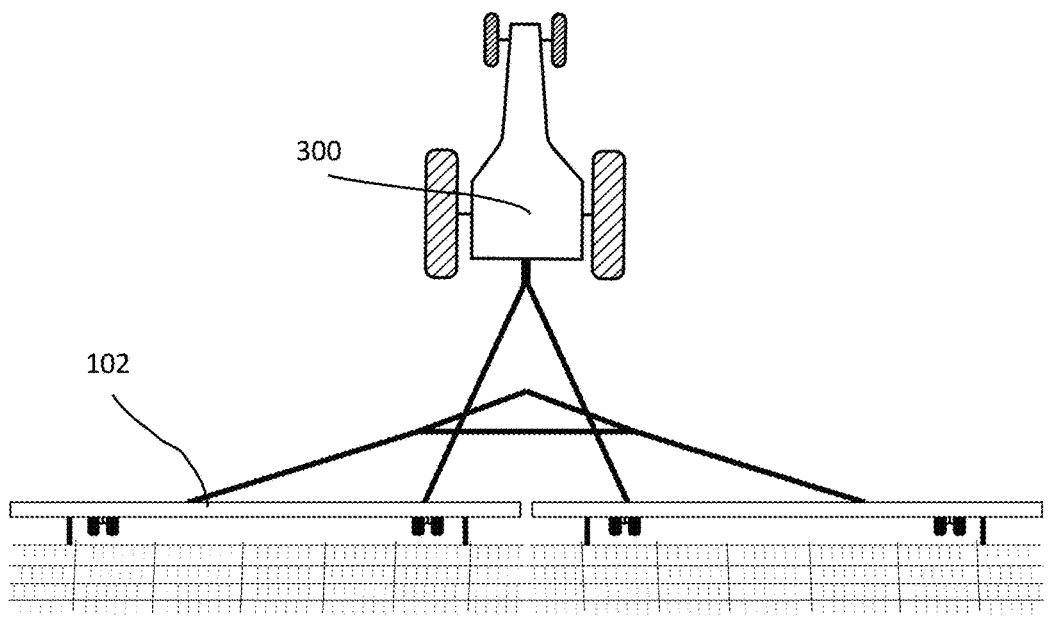
FIG. 4 is a top view of the tractor and the heavy harrow demonstrating a correct relative position and orientation.
Figure 12:
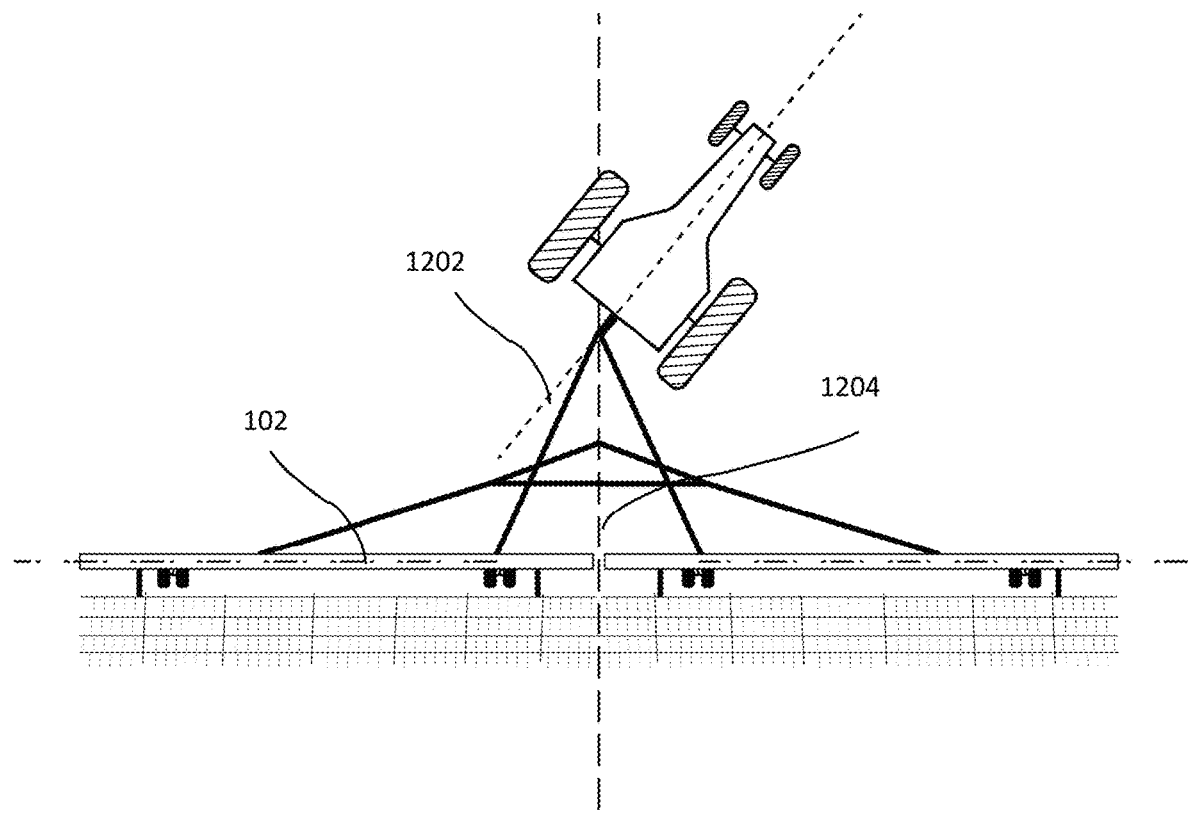
FIG. 12 is a top view of a power platform with an attached implement demonstrating a determination of a power platform axis (dot-dashed line), an implement axis (dashed line), and one or more implement wings (solid line)

When an asymmetric unfold operation is performed such as shown in FIG. 1, the processing structure 1720 may implement a pose estimation operation that receives image and/or other sensor data from the sensor system 1702 (e.g. cameras and other sensors) and may process the sensor data to detect the implement 102, estimate at least one boundary, determine a type of the implement 102, and/or determine an initial relative position and orientation of each wing 104, 106 of the heavy harrow 102 with respect to the autonomous power platform 300. The at least one boundary may be estimated by one or more of a feature descriptor extraction, a deep learning process, a supervised deep learning process, a motion measurement, an optical flow, a map building, a linear optimization, and a nonlinear optimization. The processing structure 1720 may determine if a power platform axis 1202 is oriented along an implement axis 1204 as shown in FIG. 12. In some aspects, the processing structure 1720 may map an environment for tracking and/or localization of one or more of the implement 102, the power platform 300, and/or any obstacle within the environment. When the power platform axis 1202 and the implement axis 1204 are not generally aligned such as shown in FIGS. 3 and 12, the processing structure 1720 may instruct the autonomous power platform 300 using a communication interface to travel along an alignment trajectory generated by a planner 1302 (for example, travel forward in a straight line, such as 200-feet). Alternatively, the processing structure 1720 may continually process image and other sensor data from the cameras and other sensors during the travel along the alignment trajectory and stop the power platform 300 once the power platform axis 1202 and the implement axis 1204 become generally aligned such as shown in FIG. 4. In other aspects, the power platform axis 1202 may become generally parallel to the implement axis 1204. In even some other aspects, the autonomous controller 1700 may request an operator to align the power platform axis 1202 with the implement axis 1204 manually.

The image and other sensor data may also be processed by the processing structure 1720 in order to determine if the heavy harrow 102 is in a suitable location for the unfolding operation to be performed. The suitable location may be determined by processing the image and other sensor data to determine if any obstacles are present in an area around the heavy harrow 102 and/or if the ground surface is even enough for the operation. If obstacles are detected, then the autonomous power platform 300 may travel along an obstacle avoiding trajectory generated by the planner 1302 (for example, travel forward in a straight line, such as 200-feet) until the processing structure 1720 determines that the location is suitable and far enough from obstacles for starting the unfold process.

Once the suitable location and/or the orientation between the power platform 300 and the implement 102 is reached, the processing structure 1720 may send signals to the autonomous power platform 300 in order to unlock a left wing locking mechanism (not shown) for the left wing 104 of the heavy harrow 102. The processing structure 1720 may then send signals to the left wing direction switch 224, which subsequently controls the direction of the direction control valve 214 in order to cause the left wing cylinder 204 to unfold the left wing 104.

Using the initial relative position and the orientation of each wing 104, 106, the power platform 300 may start reversing travel direction (e.g. backing up) along an unfold trajectory generated by the planner 1302 and/or the processing structure 1720 until the left wing 104 reaches a desired angle (e.g. 45-degrees). The processing structure 1720 may receive image and/or other sensor data from the cameras 1706 and/or other sensors 1702 while the power platform 300 is reversing travel direction and continually processing the image and/or other sensor data to determine the orientation of the left wing 104. The processing structure 1720 may then compare one or more updating orientation measurements of the left wing 104 to the desired angle (e.g. 45-degrees). During the reversing travel direction, the processing structure 1720 may instruct the power platform 300 to make one or more small adjustments according to the instructions generated by the planner 1302 and/or generated by the processing structure 1720 (e.g. slight turns in a left direction or a right direction) while reversing in order to assist in unfolding as slightly uneven ground, varying soil hardness, moisture, etc. may inhibit unfolding.

Once the processing structure 1720 determines that the orientation measurements of the left wing 104 have reached the desired angle, the processing structure 1720 may send signals to the autonomous power platform 300 in order to unlock a right wing locking mechanism (not shown) for the right wing 106 of the heavy harrow 102. The processing structure 1720 may then send signals to the right wing direction switch 226, which subsequently controls the direction of the direction control valve 216 in order to cause the right wing cylinder 206 to unfold the right wing 106.

Similarly, using the initial relative position and the orientation of each wing 104, 106, the power platform 300 may start reversing travel direction (e.g. backing up) along an unfold trajectory generated by the planner 1302 and/or the processing structure 1720 until the right wing 106 reaches a desired angle (e.g. 45-degrees). The processing structure 1720 may receive image and/or other sensor data from the cameras 1706 and/or other sensors 1702 while the power platform 300 is reversing travel direction and continually processing the image and/or other sensor data to determine the orientation of the right wing 106. The processing structure 1720 may then compare the updating orientation measurements of the right wing 106 to the desired angle (e.g. 45-degrees). During the reversing travel direction, the processing structure 1720 may instruct the power platform 300 to make one or more small adjustments according to the instructions generated by the planner 1302 and/or generated by the processing structure 1720 (e.g. slight turns in a left direction or a right direction) while reversing in order to assist in unfolding as slighting uneven ground, varying soil hardness, moisture, etc. may inhibit unfolding.

Once both wings 104, 106 have been unfolded to the desired angle, the desired angle for each of the wings 104, 106 may then be changed to a full operation angle, such as 90-degrees. At this point, the power platform 300 may continue to reverse travel direction until both the left wing angle and the right wing angle reach the full operation angle. The processing structure 1720 may receive image and/or other sensor data from the cameras 1706 and/or other sensors 1702 while the power platform 300 is reversing travel direction and continually processing the image and/or other sensor data to determine the orientation of both the left wing 104 and the right wing 106. The processing structure 1720 may then compare the updating orientation measurements of the both wings 104, 106 to the full operation angle.

Once the wings 104, 106 have been locked into the field position, the processing structure 1720 may send one or more signals to the autonomous power platform 300 in order to activate the harrow lift direction switch 222, which subsequently controls the direction of the direction control valve 212 in order to cause the harrow lift cylinder 202 to lower a plurality of harrow tines 118 down to the ground. The processing structure 1720 may receive image and/or other sensor data from the cameras 1706 and/or other sensors 1702 and may process the image and/or other sensor data to determine when the harrow tines 118 are down. Once the processing structure 1720 detects the harrow tines 118 are down in their desired location and orientation, the harrow lift direction switch 222 may be deactivated. Finally, the processing structure 1720 may signal the harrow bar to be ready for field operation.

Figure 5:
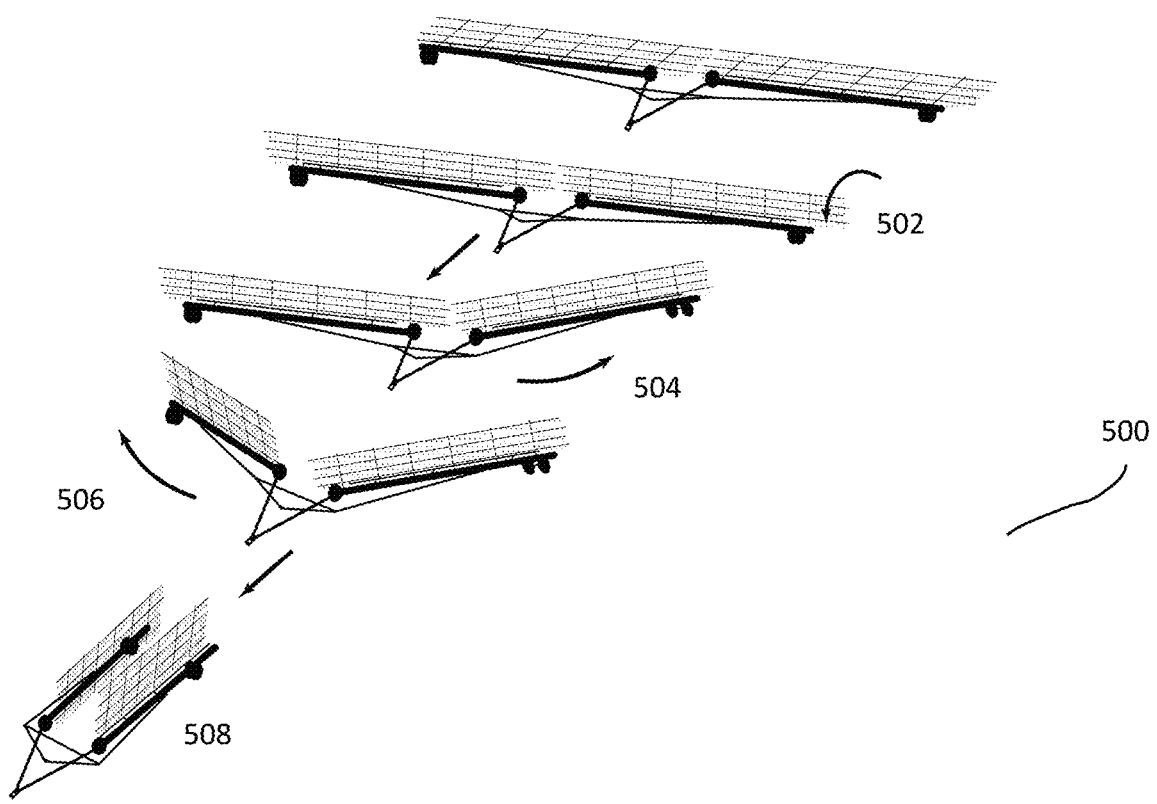
FIG. 5 is a perspective top view of the folding heavy harrow demonstrating a folding procedure.

When an asymmetric fold operation 500 is performed as shown in FIG. 5, the processing structure 1720 may execute the pose estimation operation that receives image and/or other sensor data from the cameras 1706 and/or other sensors 1702 and may processes the image and/or other sensor data to determine if the power platform axis 1202 is oriented along the implement axis 1204. If the power platform axis 1202 and the implement axis 1204 are not generally aligned such as shown in FIGS. 3 and 12, the processing structure 1720 instructs the power platform 300 to travel along a trajectory generated by the planner 1302 and/or the processing structure 1720 (for example, travel forward in a straight line, such as 200-feet) or the processing structure 1720 may request the operator to align the axes by manually driving the power platform 300. Alternatively, the processing structure 1720 may continually process image and/or other sensor data from the cameras 1706 and/or other sensors 1702 during the motion of the power platform 300 and stop the power platform 300 once the power platform axis 1202 and the implement axis 1204 are generally aligned such as shown in FIG. 4. The pose estimation may also determine the initial position and orientation of the wings 104, 106.

The processing structure 1720 may send one or more signals to the autonomous power platform 300 in order to activate the harrow lift direction switch 222, which subsequently controls the direction of the direction control valve 212 in order to cause the harrow lift cylinder 202 to raise the plurality of harrow tines 118 from to the ground into the desired transport position 502. The processing structure 1720 may receive and process image and/or other sensor data from the cameras 1706 and other sensors 1702 in order to determine when the harrow tines 118 reach a fully raised position.

The processing structure 1720 may send signals to the autonomous power platform 300 in order to open the left wing locking mechanism (not shown) for the left wing 104 of the heavy harrow 102. The processing structure 1720 may then send signals to the left wing direction switch 224, which subsequently controls the direction of the direction control valve 214 in order to cause the left wing cylinder 204 to fold the left wing 104 as shown in position 504 in FIG. 5. Using the initial position and orientation of the left wing 104, the processing structure 1720 may instruct the power platform 300 to drive forward along a trajectory generated by the planner 1302 and/or the processing structure 1720. The processing structure 1720 may continue to receive and process image and/or other sensor data to determine when the orientation of the left wing 104 reaches the desired angle (e.g. 45-degrees) as previously described. The trajectory may be generated with a common trajectory planning, a graph-based search, a search over a configuration space, a grid-based search, an interval-based search, a geometric process, an artificial potential field, a sampling-based process, a linear optimization, a nonlinear optimization, and a probabilistic roadmap.

Once the left wing 104 has reached the desired angle as shown in position 506 of FIG. 5, the processing structure 1720 may send signals to the autonomous power platform 300 in order to open a right wing locking mechanism (not shown) for the right wing 106 of the heavy harrow 102. The processing structure 1720 may then send signals to the right wing direction switch 226, which subsequently controls the direction of the direction control valve 216 in order to cause the right wing cylinder 206 to fold the right wing 106. The power platform 300 may then travel along a trajectory generated by the planner 1302 and/or the processing structure 1720 in order to fold the right wing 106 to the desired angle (e.g. 45-degrees). Similarly, the processing structure 1720 may continue to receive and/or process image and/or other sensor data to determine when the orientation of the right wing 106 reaches the desired angle such as shown in position 506.

Once both of the wings 104, 106 reach the respective desired angles, the direction control switches 224, 226 may be deactivated and the processing structure 1720 may instruct the power platform 300 to continue travelling along the trajectory generated by the planner 1302 and/or the processing structure 1720 until both of the wings 104, 106 reaches a desired transport angle (e.g. 0-degrees) in step 508 of FIG. 5. The processing structure 1720 may then signal the harrow bar to be ready for a transport operation.

Figure 6:
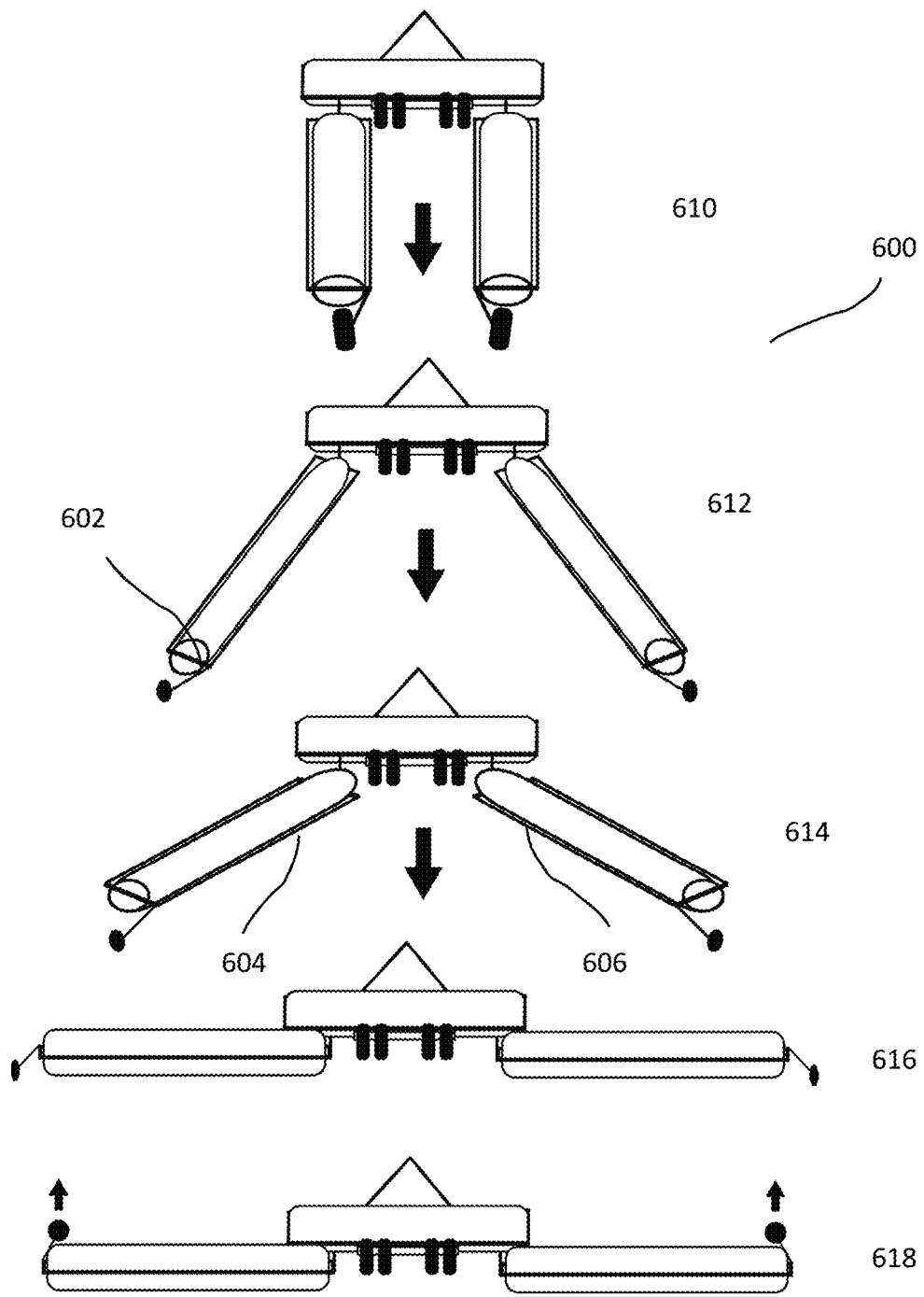
FIG. 6 is a top view of an unfolding procedure for a land roller.
Figure 7:
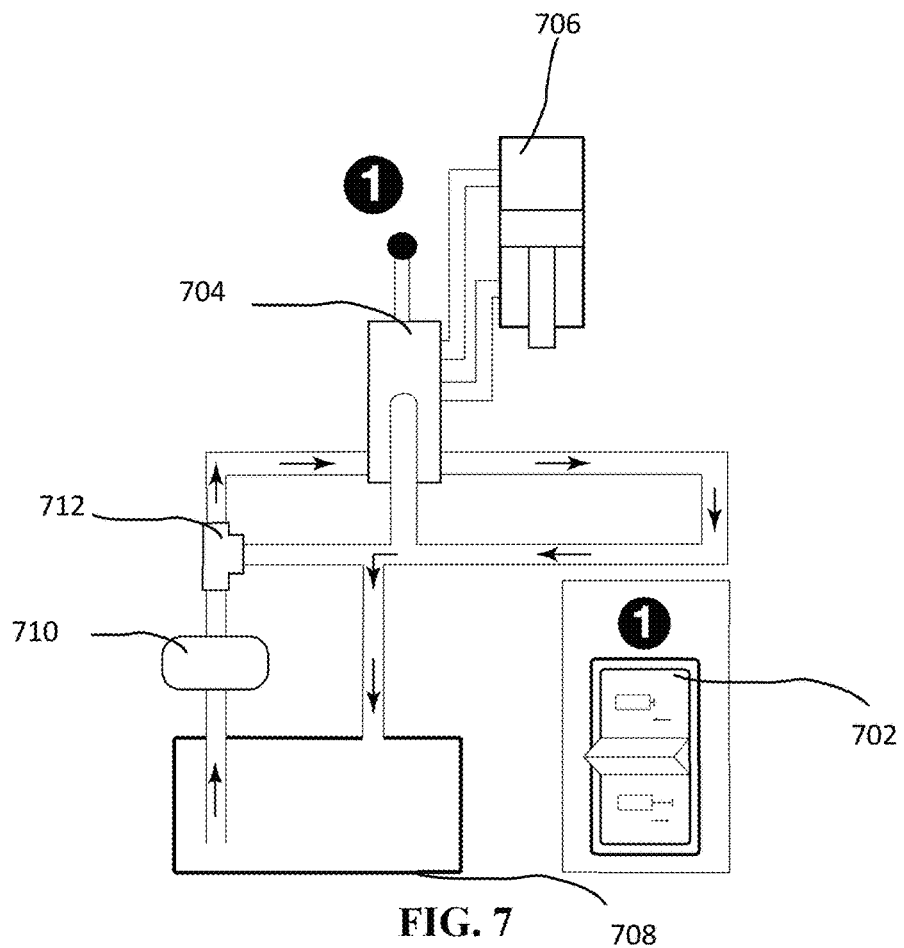
FIG. 7 is a conceptual diagram of one or more hydraulic remote connections between the autonomous power platform and the land roller.

Turning to FIG. 6, a symmetric unfolding operation 600 for a land roller 602 is shown. Similar to the asymmetric unfolding operation 100, the processing structure 1720 may implement a pose estimation operation that receives image and/or other sensor data from the cameras 1706 and/or other sensors 1702 and may process the image and/or other sensor data to determine an initial relative position and orientation of each wing 604, 606 of the land roller 602 with respect to the power platform 300. The processing structure 1720 may determine if a power platform axis 1202 is oriented along an implement axis 1204. If the power platform axis 1202 and the implement axis 1204 are not generally aligned, the processing structure 1720 instructs the autonomous power platform 300 to travel along an alignment trajectory generated by the planner 1302 and/or the processing structure 1720 (for example, travel forward in a straight line, such as 200-feet) or the processing structure 1720 may request the operator to align the axes 1202, 1204 by manually driving the power platform 300. Alternatively, the processing structure 1720 may continually process image and/or other sensor data from the cameras 1706 and/or other sensors 1702 during the motion of the power platform 300 and stop the power platform 300 once the power platform axis 1202 and the implement axis 1204 are generally aligned such as shown in FIG. 4. In other aspects, the power platform axis 1202 may be generally parallel to the implement axis 1204 rather than aligned.

Unlike the asymmetric unfolding operation 100, both wings 604, 606 of the land roller 600 unfold symmetrically or quasi-symmetrically. Using the initial relative position and orientation of the wings 604, 606 such as shown in position 610 of FIG. 6, the planner 1302 and/or processing structure 1720 may instruct the power platform 300 to travel along an unfold trajectory generated by the planner 1302 and/or the processing structure 1720 until the left wing 604 and the right wing 606 reach a desired angle. The desired angle may be the angle from the respective wing 604, 606 to the implement axis 1204 (such as 85-degrees in position 614 of FIG. 6) or the desired angle may be the angle between the wings 604, 606 (such as 170-degrees). In some aspects, the desired angle may be manually provided by the operator or automatically determined by the processing structure retrieving the desired angle from an existing database and/or calculating the desired angle. The processing structure 1720 may continually receive image and/or other sensor data, determine the angles of the left wing 604 and the right wing 606, and make motion adjustments to the power platform 300 in order to ensure that the wings 604, 606 unfold evenly such as shown in position 612 of FIG. 6.

Figure 8:
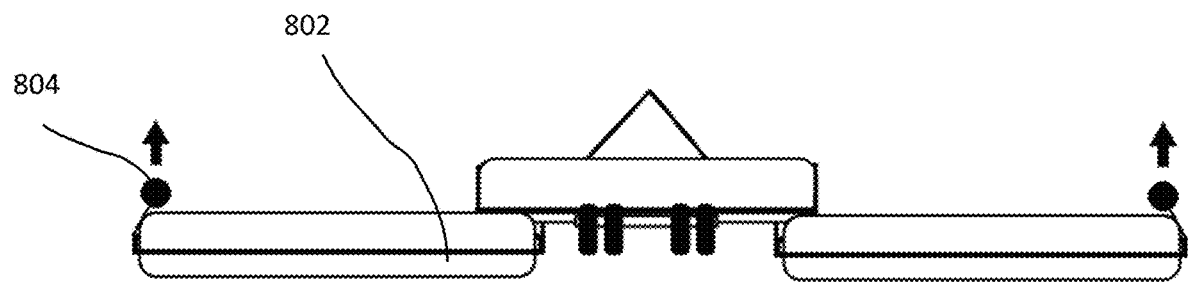
FIG. 8 is a top view of the unfolding procedure for the land roller.

Once the processing structure 1720 determines the wings 604, 606 have reached the desired angle, the processing structure 1720 may instruct the power platform 300 to halt propulsion (as shown in position 614 of FIG. 6). The processing structure 1720 may activate a roller lift switch 702. The roller lift switch 702 may set a direction for a direction control switch 704 that may provide hydraulic fluid via a hydraulic circuit to a roller lift cylinder 706. The hydraulic circuit may comprise a reservoir 708 of hydraulic fluid, a pump 710 providing pressure, and a relief valve 712. The roller lift cylinder 706 may lower one or more drums 802 completely to the ground, as shown in position 616, and one or more transport end wheels 804 may be raised fully as shown in FIG. 8 or position 618 in FIG. 6.

Figure 9:
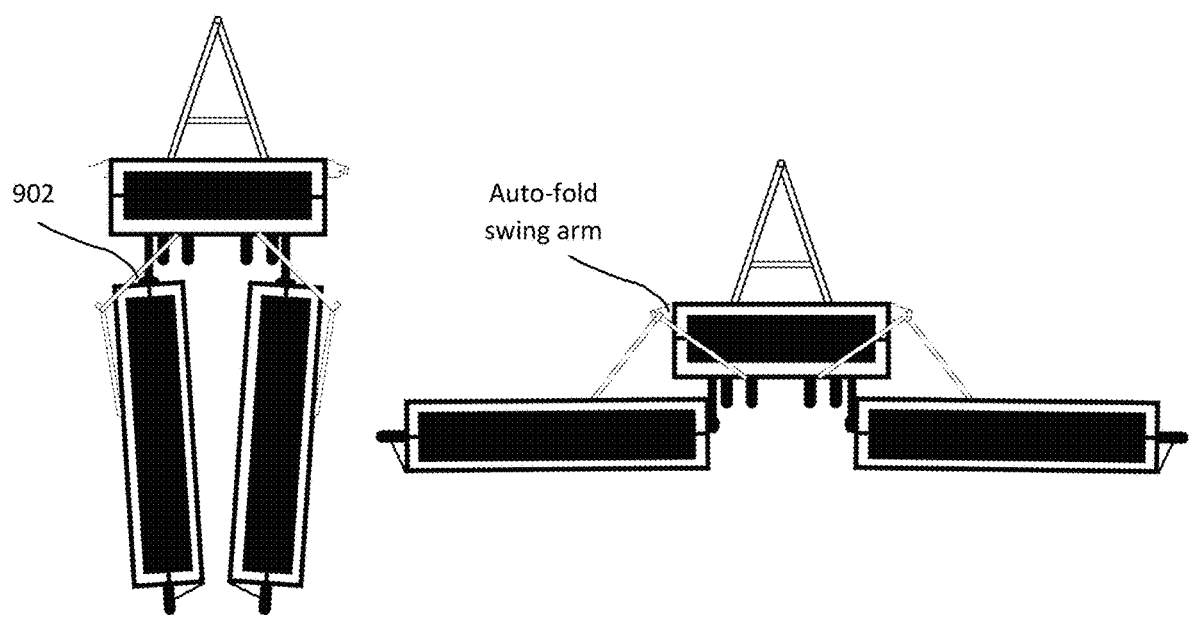
FIG. 9 is a perspective view of an automatic swing arm lock attachment for the land roller.
Figure 10:
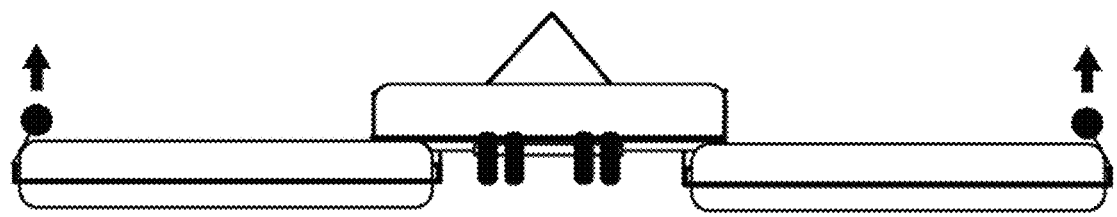
FIG. 10 is a top view of the land roller in a field working position.

The processing structure 1720 may then instruct the power platform 300 to continue the motion with slight steering adjustments based on the inputs from the planner 1302 and/or from the processing structure 1720 until the wings 604, 606 reach a final desired angle of 90-degrees, as shown in FIG. 10. The adjustments may be determined from one or more of: a Proportional-Derivative-Integral (PID), a Model Predictive Control (MPC), a linear control process, a nonlinear control process, a deep learning process, and a reinforcement learning-based process. When the final desired angle is reached, an automatic swing arm lock 902 may automatically latch as shown in FIG. 9 and/or the processing structure 1720 may instruct the power platform 300 to halt. The processing structure 1720 may then signal the land roller 602 to be ready for field operation.

Figure 11:
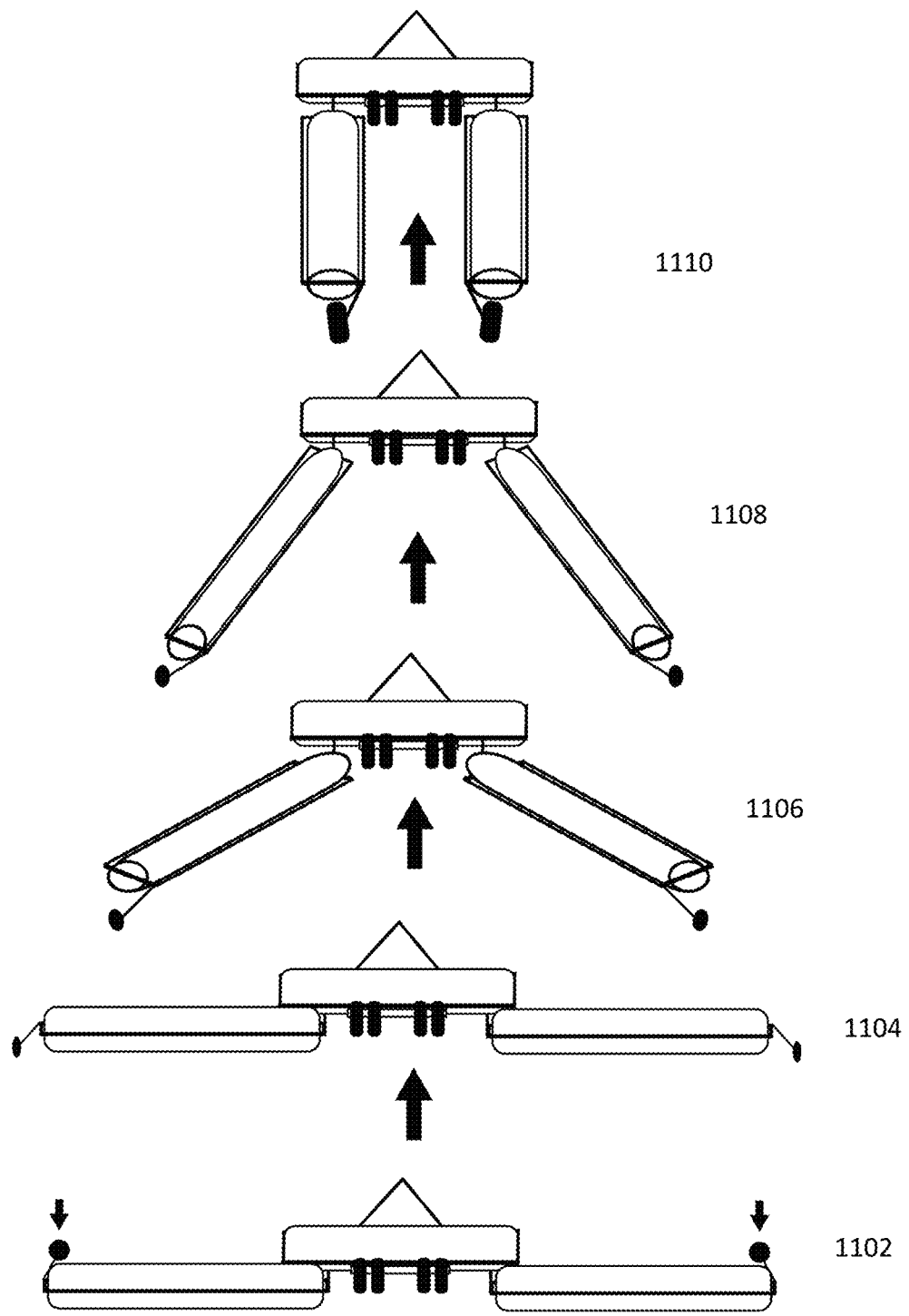
FIG. 11 is a top view of a folding procedure for the land roller.

When a symmetric fold operation is performed as shown in FIG. 11, the processing structure 1720 may execute the pose estimation operation that receives image and/or other sensor data from the cameras 1706 and/or other sensors 1702 and processes the image and/or other sensor data to determine if the power platform axis 1202 is oriented along the implement axis 1204. If the power platform axis 1202 and the implement axis 1204 are not generally aligned, the autonomous power platform 300 may travel along a trajectory generated by the planner 1302 and/or the processing structure 1720 (for example, travel forward in a straight line, such as 50-feet) or the processing structure 1720 may request the operator to align the axes by manually driving the power platform 300. Alternatively, the processing structure 1720 may continually process image and/or other sensor data from the cameras 1706 and/or other sensors 1702 during the motion of the power platform 300 and stop the power platform 300 once the power platform axis 1202 and the implement axis 1204 are generally aligned. The pose estimation may also determine the initial position and orientation of the wings 604, 606 as shown in position 1102 of FIG. 11. In some aspects, the processing structure 1720 may determine an amount of open space present in order for the implement to be properly folded, such as 200-feet.

The processing structure 1720 may then activate the roller lift circuit 702 in order to extend the wheel lift cylinders (not shown) to extend the wheels 804 and raise the drums 802 off the ground by approximately 3-feet. This action may cause one or more auto-fold cables (not shown) to tighten in order to open the automatic swing arm locks 902. The processing structure 1720 may receive and process image and/or other sensor data to determine when the drums 802 are raised and thereby deactivating the roller lift circuit 702. The processing structure 1720 may instruct the power platform 300 to continue its motion and may continue to monitor the angles of the wings 604, 606 at positions 1104, 1106, 1108 of FIG. 11 until the processing structure 1720 detects when the wings 604, 606 are straight back as shown in position 1110 of FIG. 11. The processing structure 1720 may then signal the land roller 602 to be ready for the transport operation.

A training process operating on the processing structure 1720 for the autonomous power platform 300 and an unknown implement may now be described. In order to train the processing structure 1720 for the unknown implement, the processing structure 1720 may be placed into a training mode, which may execute one or more observation steps. During the one or more observation steps, the cameras 1706 and/or other sensors 1702 may capture image and/or other sensor data as an operator performs a transition from the transport position to the field working position (e.g. the unfolding) and/or a transition from the field working position to the transport position (e.g. the folding) operations. The processing structure 1720 may process the image and/or other sensor data using one or more computer vision (CV) and artificial intelligence (AI) techniques, as described in further detail below, in order to locate and determine the pose for one or more features of the implement.

In this aspect, the processing structure 1720 may locate the wings 104, 106, 604, 606 within the image and/or other sensor data and may constantly monitor the pose for each of the wings 104, 106, 604, 606 with respect to the power platform 300. As the processing structure 1720 monitors the pose of the wings 104, 106, 604, 606, the processing structure 1720 may monitor and may record one or more controls being actuated by the operator. The processing structure 1720 may also request for feedback from the operator at each step of the process to determine if each step of the process succeeded or failed. The processing structure 1720 may then associate a motion of one or more features of the implement, detected in the image and/or other sensor data, with a corresponding control being actuated by the operator and with the feedback received from the operator.

Once the training has been completed for one or more folding or unfolding operations, the operator exits from training mode and the processing structure 1720 may store the training steps in long term memory 1732 and/or an online database 1734 (e.g. cloud-based, offsite, and/or remote database). In some aspects, such as with a roller, no training may be required and the processing structure 1720 may use a standard task set 1302a stored in the database 1734 or memory 1732 to fold or unfold the implement. In some other aspects, the task set 1302a may be customized for each implement. In even some other aspects, an expert operator may create a completely custom task set for an arbitrary implement and add the custom task set to the database 1734 on the autonomous controller 1700 or in the online database 1734.

The operator may then select any previously stored training process from the long term memory 1732 or online database 1734 using a graphical user interface 1738 in order to fold and/or unfold the implement. In some aspects, the user interface 1738 may be voice controlled, gesture controlled, remote controlled and/or a combination thereof. In some aspects, the processing structure 1720 may automatically detect any previously stored training process. Each training process may comprise a set of control steps with the sensor data from actuators 1716, 1718 and a set of positions and/or angles for objects of interest with the sensor data plus the data from operator feedback about the success or failure of each step of the folding or unfolding process.

When the processing structure 1720 detects a deviation of any of the control steps and/or positions and/or angles, the processing structure 1720 may indicate a fault on the user interface 1738, stored in a log file, or in some aspects, the autonomous controller 1700 may perform corrective action itself, store the fault in the database 1734 and halt movement of the power platform 300. An example of a corrective action may be stopping the power platform 300 or halting movement of the power platform 300. In some aspects, the operator may modify and/or customize a set for a selected training process. In some aspects, the processing structure 1720 may confirm that any operator changes to the training process do not damage the implement.

A control method executed by the processing structure 1720 is now described in further detail with regard to FIGS. 12 to 16. Some of the aspects of the control method may be executed during the training mode. The processing structure 1720 may determine, filter, and/or measure one or more control parameters and/or variables, such as for example one or more of the following: Linear speed of the power platform 300 and the implement, represented as and $V_{imp}$; Rotational speed of the wheels of the power platform 300, represented as V (m/s) $\omega_t$ (rad/s) for t=1, 2, . . . , N; Relative orientation between the power platform axis 1202 and the implement axis 1204 as shown in FIG. 12, represented by β (rad); Relative orientation between the implement axis and N number of wings 104, 106, 604, 606 of the implement 102, 602 as shown in FIG. 12, represented by $\alpha_t$(rad) for t=1, 2, . . . , N; Rate of change of relative orientation between the power platform axis 1202 and the implement axis 1204

$$\left(\frac{rad}{s}\right);$$

Rate of change of relative orientation between the implement axis and N number of wings 104, 106, 604, 606 of the implement 102, 602

$$\left(\frac{rad}{s}\right);$$

Steering angle for all the wheels of the power platform 300 δt (rad) for i=1, 2, . . . , N; Rate of change of steering angle for all the wheels of the power platform 300

$$\left(\frac{rad}{s}\right);$$

Curvature of the paths that wheels of the power platform 300 may follow Γ; Status of N hydraulic switches on the power platform 300 that are connected to the implement 102, 602 (on/off) $S_t \in \{0, 1\}$ for t=1, 2, . . . , N; Signals from all the actuators (e.g. If hydraulic actuators are used, the signal is pressure and stroke length. If electric actuators are used, the signal is voltage or current.); Position of the power platform 300 and the implement represented as Pp and Pimp measured in meters; Set of all constraints for all the variables and parameters represented as C={ci} i=1, 2, . . . , N; Throttle value for the power platform 300 represented as u1 which is a real number; and Rotational speed of the engine shaft represented as u2 measured in RPM.

Figure 13:
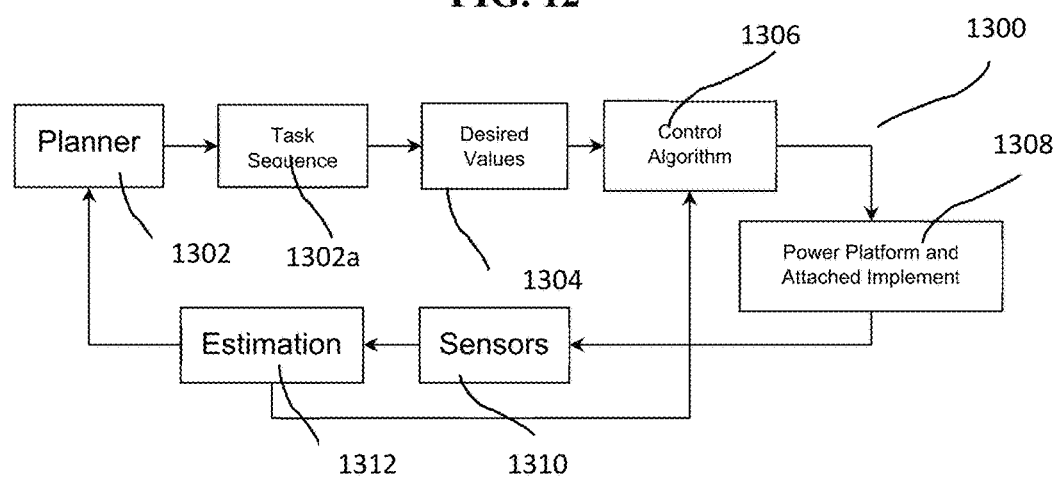
FIG. 13 is a block diagram of a control strategy.

A block diagram of the control method 1300 executing on the processing structure 1720 is presented in FIG. 13. The control method 1300 may begin by determining an initial state of the power platform 300 and the associated implement 102, 602, one or more inputs, and one or more outputs. This determination may be performed using an estimation block 1312 and/or one or more sensors 1310 to determine the one or more states of the power platform 300, the implement 102, and/or a combination thereof. The estimation block 1312 may comprise one or more of: a geometric process, a Kalman filter, a linear optimization, a nonlinear optimization, and a moving horizon estimation. In this aspect, the inputs may comprise: a throttle represented as a real number from 0 to 100 for driving the wheels of the power platform 300; one or more steering angle input commands $\delta_{ot}$ (rad) for the power platform 300; and/or one or more hydraulic switch commands on the power platform 300 that may be connected to the implement 102, 602 (on/off) $S_{t0} \in \{0, 1\}$ for, $t=1, 2, \ldots, N$. The one or more hydraulic switch commands may be used to lock and/or unlock individual wings 104, 106, 604, 606 of the attached implement 102, 602. In some aspects, there are additional inputs/outputs which may comprise voltage and/or current to/from electric actuators, switches and/or valves. The initial states may be one or more of the control parameters presented herein. In some aspects, the control method 1300 may have full-state feedback wherein one or more of the control parameters herein may be the outputs of the control method. Some of the outputs may be directly measured by one or more sensors 1702, such as a rotational speed of the wheels being measured by an encoder or relative orientation between each wing 104, 106, 604, 606 and the implement axis 1204. Further details of each block on the control method 1300 may be presented below.

A planner block 1302 may receive one or more of the control parameters and variables, the sensor data from the sensors 1702 and the estimation of parameters and variables from the estimation block 1312. Various planning tasks may be computed in this block. For tasks related to the motion of the power platform 300 and the implement, the estimation block 1312 may generate a trajectory for the power platform 300 to follow. For folding and unfolding processes, the estimation block 1312 may generate and/or modify the steps in a task set 1302a, and/or the estimation block 1312 may determine the desired values 1304 for the next step of the set in real-time based on the changes happening in the environment (e.g., an uneven ground). In some other aspects, the planner block 1302 may receive one or more inputs from an operator, for example, the desired angle for each wing, using one or more of the interfaces for the processing structure 1720, to customize the planning task. The collection of those various tasks may be computed by the planner block 1302 and may be referred to as a plan.

A task set block 1302a may retrieve a specific set of one or more control tasks for a specific implement from long-term memory 1732 or the database 1734. In some aspects, this task set may be generated automatically by the planner block 1302. In some other aspects, the task set may be retrieved from long-term memory 1732 or the database 1734 and then modified by the planner block 1302 to adapt to changes to the implement, power platform 300, and/or the changes in the environment. In some other aspects, this task set may be provided by an expert operator in a format compatible by the processing structure 1720 on the autonomous controller 1700. As an example, the heavy harrow 102 may comprise the following task set:

a. Initialize a folding/unfolding process for the heavy harrow 102
b. Straightening the power platform 300 relative to the attached implement 102 ($\theta$) by following a trajectory generated by the planner block 1302;
c. Activate hydraulic switch $S_1$;
d. Open wing 104 by angle $\alpha_1$;
e. Activate hydraulic switch $\alpha_2$;
f. Open wing 106 by angle $\alpha_2$;
g. Open both wings 104, 106 by angles $\alpha_1$ and $\alpha_2$;
h. Deactivate hydraulic switches $S_1$ and $S_2$ to lock the wings 104, 106;
i. Activate Hydraulic switch $S_2$ to lower the harrow tines; and/or
j. End the process for folding/unfolding the heavy harrow 102.

A similar set, specific to each implement 102, 602 may be retrieved based on the implement 102, 602 currently attached to the power platform 300. For each task in the task set, a desired value block may be retrieved from the long-term memory 1732 or the database 1734 prior to setting up a controller block 1304. In the example of the heavy harrow implement 102, in the second task (b), to straighten the power platform 300 relative to the attached implement 102 may translate to a desired value of $\beta_o = \pi$ (rad) and/or for the hydraulic switches, the desired value may be either 0 or 1 (on/off). In some other aspects, the retrieved desired values may be automatically updated by the planner block 1302 during the folding/unfolding process. In some other aspects, the desired values may be customized by an operator.

These blocks 1302, 1302a, 1304 may receive the initial states from inputs from the Estimation block 1312. The task set block 1302 may use this initial state data to determine when a task is finished and/or when a new task may need to be sent to the control block 1306.

A control block 1306 may comprise a variety of control methods that may depend on one or more requirements of the power platform 300 and/or the implement 102, 602.

For each task from the task set block 1302a, the task may be selected and the desired values of the states may be determined in the desired values block 1304. These desired values for the states of the power platform 300 and/or the attached implement 102, 602 may then be sent to the control block 1306. Depending on the selected task, certain control methods, such as Proportional-Derivative-Integral (PID), Model Predictive Control (MPC), linear or nonlinear control algorithms, may be used to determine the values for manipulated variables. In some aspects, reinforcement learning and/or end-to-end deep learning methods may be used to determine the values for manipulated variables. These manipulated variables may be sent to the power platform 300 as input commands.

In some aspects, the motion of the power platform 300 may be optimized. For example, the power platform 300 may be instructed to turn sharp and/or fast at the beginning of the turn, to fold/unfold one or more wings of the attached implement 102, and accept some amount of overshooting in response to the instructions. These sharp and/or fast turns may allow the power platform 300 to perform the folding/unfolding operation in a smaller space.

The power platform 300 may follow the received commands and the sensors 1310 may measure the updated states of the power platform 300 and/or the attached implement 102, 602 after one sampling time. The sampling time of the control block 1306 may vary for each of the different tasks and/or the implement 102, 602. For example, the sampling time may be as low as 0.01 second. One or more sensor measurements may be sent to the estimation block 1312 and a full estimated state of the power platform 300 and the attached implement 102, 602 may be sent to the planner block 1302 so the planner block 1302 may generate, retrieve and/or modify the task set block 1302a. The one or more sensor measurements may be sent to the control block 1306 providing a closed feedback loop. The closed loop may repeat until the states of the power platform 300 and/or the attached implement 102, 602 reach the desired values. Afterwards, the task set block 1302 may acknowledge that the task is finished and a next task may be sent to the control block 1306 if any exists.

The processing structure 1720 may continuously store all or a subset of inputs and outputs of the autonomous controller, for one or more blocks, in a database on the processing structure 1720 and/or in the offsite database. The processing structure 1720 may communicate any information about the autonomous controller, power platform 300, and/or the attached implement 102 with an operator through one of the user interfaces 1738.

A power platform and attached implement block 1308 may receive one or more control input adjustments from the control method block 1306. The block 1308 may comprise one or more mechanical systems, one or more hydraulic systems, one or more wired/wireless communication systems, and/or one or more electrical systems associated with the power platform 300 and/or the implement 102, 602 as described herein.

A sensor block 1310 may comprise one or more sensors (and associated electronics) configured to measure the parameters and variables of the power platform 300 and/or the implement 102, 602. The sensors may comprise one or more of the following: cameras (RGB cameras in stereo configuration, monochrome cameras, depth cameras, multi-spectral and hyper-spectral cameras, etc.), GPS, light detection and ranging (LiDAR), radio detection and ranging (Radar), sound navigation and ranging (Sonar), inertial measurement unit (IMU), microphones, optical and/or magnetic encoders, and magnetometer as well as digital switches and analog potentiometers. One or more cameras 1706 are used to measure $\alpha_t$ (rad) for t=1, ..., N and/or $\beta$(rad). One or more rotary encoders are used to measure: rotational speed of the wheels of the power platform, represented by $\omega_t$ (rad/s) for t=1, ..., N; relative orientation between the main axis of the power platform and the main axis of the attached implement, represented by $\beta$ (rad), and/or steering angle of the wheels for the power platform $\delta t$ (rad). In some other aspects, one or more cameras 1706 in combination with other ranging sensors (LiDAR, Radar or Sonar) 1708 may be used to measure $\alpha$ t (rad) for t=1, ..., N and/or $\beta$ (rad). In some other aspects, one or more cameras 1706 in combination with other ranging sensors may be used to estimate the pose of the attached implement 102 and/or one or more features of the implement (e.g. the wings) relative to the power platform 300 and/or the implement itself.

Figure 14:
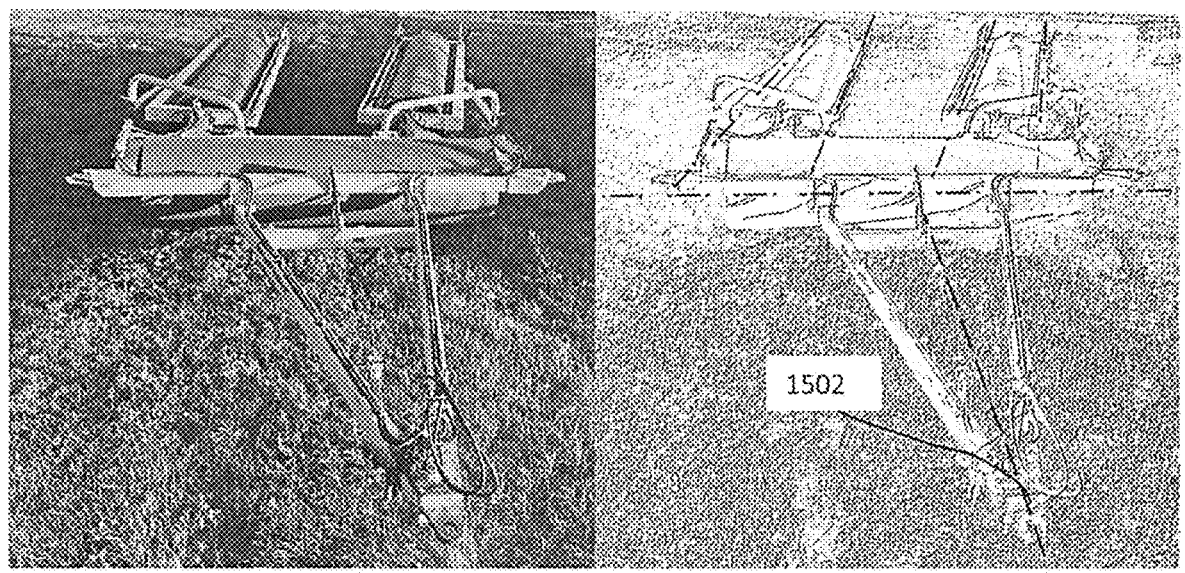
FIG. 14 is an example of edge detection and an estimation of main axes of one or more objects in an image frame taken by a camera.

In order to determine the relative orientation between the power platform axis 1202 and one or more wing axes various computer vision and/or object detection techniques may be executed on the processing structure 1720 and/or cloud-based processing structures 1734. In some aspects, to determine the relative orientation between the power platform axis 1202 and one or more wing axes, feature descriptor extraction and matching methods in image and/or other sensor data from one or more cameras 1706 and/or other sensors 1702 may be used to detect the implement and one or more wings. In some aspects, the implement and/or its wings may be detected by continuously measuring optical and motion flow in image and other sensor data from cameras and other sensors. The optical and motion flow may be used to separate the implement from the background in image and other sensors' frame. In some other aspects, the implement 102, 602 may be detected using a map building method by processing image data from one or more cameras along with data from other sensors such as LiDARs. The processing structure 1720 may process the image and/or other sensor data in order to generate a map of an environment around the power platform 300, which includes the attached implement 102, 602. In the generated map, the processing structure 1720 may determine a ground surface. The processing structure may extract one or more boundaries around the attached implement 102, 602 that is within the camera(s) 1706 and/or other sensors' frame or estimate the pose of the axes for the implement and its wings in the camera(s) 1706 and/or other sensors' frame. An example of the boundary and axes estimation in image data from cameras for a roller implement is shown in FIG. 14. In some aspects, the processing structure 1720 may determine rough boundaries for the implement 102, 602 and/or estimations for the axes of the implement and the wings followed by further refinement of the boundaries and estimations of the axes as described below.

In order to refine the rough boundaries and/or identify features of the implement 102, 602, a data set may be collected and processed by the processing structure 1720 using one or more machine learning and/or computer vision algorithms for object detection. The learning algorithm may have been trained during the training process as previously described. In some aspects, the training may be performed offline after manually capturing and labelling a number of image and/or other sensor data frames (i.e., LiDAR) of the implement (e.g., 5000 frames). In some other aspects, the refinement of the rough boundaries may be performed by incorporating the data from other sensors (e.g., LiDAR) 1702 in the training process of the learning algorithms.

Figure 15A:
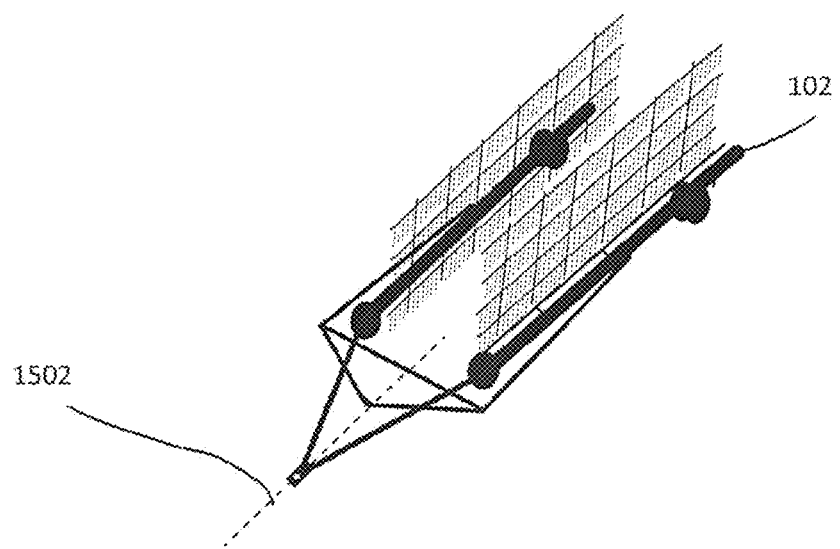
FIG. 15A is a top front perspective view of the folded implement demonstrating a distinct feature of the implement to detect the implement axis in the image frame.
Figure 15B:
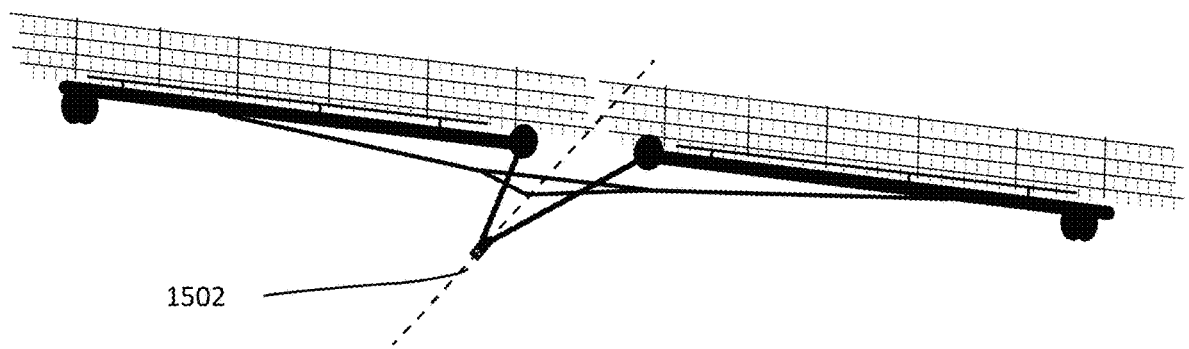
FIG. 15B is a top front perspective view of the unfolded implement demonstrating the distinct feature of the implement to detect the implement axis in the image frame.

One of the features may be detecting the implement axis 1204. The implement axis 1204 may appear generally stationary with regard to the wings 104, 106 that may move. The implement axis 1204 may also rotate about a hitch attached to the power platform 300. The determination of the implement axis 1204 may be further assisted by attaching one or more fiducial markers or distinct features 1502 to the implement such as shown in FIGS. 15A and 15B. In some other aspects, the determination of the implement axis may be done by adding a rotary encoder (optical or magnetic) to the hitch. In even some other aspects, any prior knowledge about the 3D structure of the implement, its wings and/or the power platform 300 may be used to more accurately estimate the pose of the implement, its wings, power platform 300 and or their respective axes.

Figure 16:
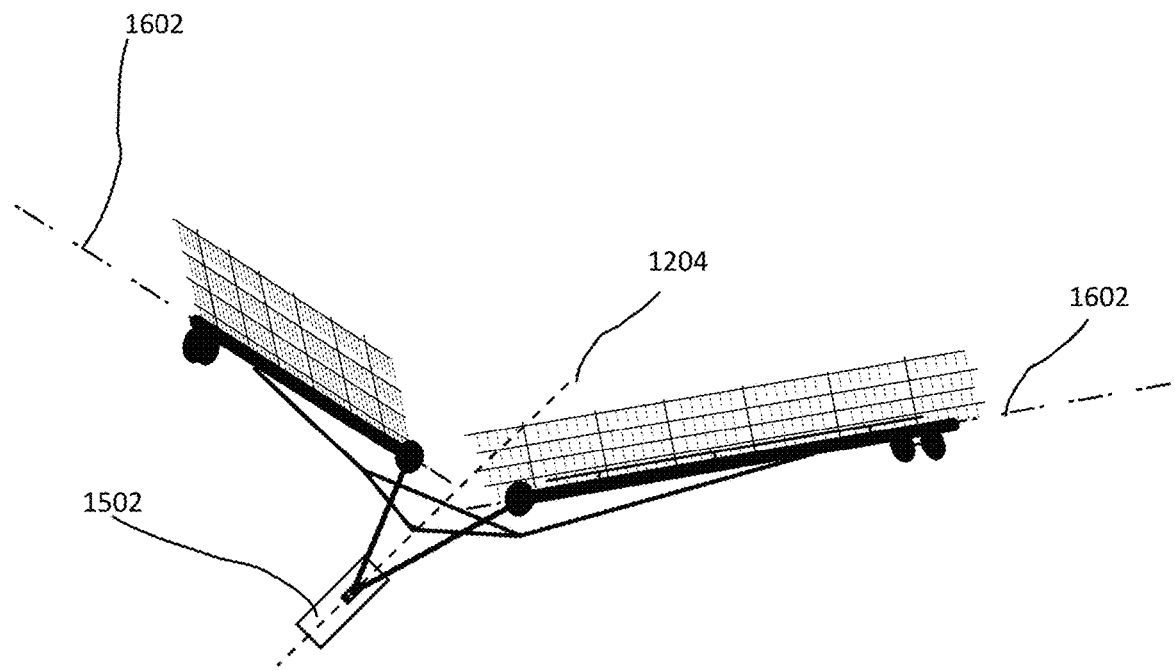
FIG. 16 is a top front perspective view of the implement starting the unfolding procedure showing a detection of one or more wings of the implement after processing the data from cameras and other sensors.

Following detection of the implement axis 1204, the wings 104, 106 may be determined in a similar fashion. When the wings 104, 106 are fully folded, detection of the individual wings 104, 106 may not be performed as the angle between the wings 104, 106 and the implement axis 1204 may be approximately zero. In some aspects, detection and pose estimation for wings 104, 106 may be done simultaneously with the detection of the implement 102, 602 and estimation of the main axis. In some other aspects, as soon as the processing structure 1720 enters an unfolding procedure, the processing structure 1720 may begin processing the image and other sensor data to estimate the pose of the wings 104, 106. In some other aspects, by limiting a search for the wings 104, 106 to only during unfolding and/or folding operations, processing time may be reduced as the wings 104, 106 may be more easily distinguished from the background in image frames where the wings 104, 106 are moving as shown in FIG. 16.

After detecting the wings 104, 106, a straight line 1602 may be fitted to a detected area (which may be a 3D point cloud and/or a set of image feature descriptors) in the image frame using methods from linear algebra and/or geometry, and then the relative orientation between the fitted line 1602 and the implement axis 1204 may be estimated as the wing angle.

In the estimation block 1312, one or more estimated states may be determined as the state may not be directly measured. The estimation block 1312 may also filter measurement from sensors 1310 having noisy measurements. The estimation block 1312 may also implement a tracking algorithm for tracking the detected implement and wings in image and other sensors' frame. For example, a Kalman Filter may be used to track desired image descriptors when detecting implement and wings in the image and other sensors' frame. In the estimation block 1312, one or more calibration methods may be used to estimate the intrinsic and/or extrinsic parameters of the cameras 1706 and/or other sensors 1702. The output of the estimation block 1312 may be sent to the planner block 1302 and the task set block 1302a for determining if the task is finished or the new task needs to be sent to the control block 1306. The output may also be sent directly to the control block 1306 as the feedback from states of the power platform 300 and the attached implement 102, 602 in the control algorithm.

According to the aspects described herein, the computer vision and machine learning techniques may work for any implement with any colour. For certain implements with distinct colours, such as very bright colours, unique colours, etc., the segmenting of the implement may require less processing resources as the segmentation may be based only on the distinct colour.

According to some aspects herein, the processing structure may be trained for an unknown implement and/or may retrieve a previous training from the online database 1734. In some aspects, the training output may be transferred using local file transfer through an external storage device (for example, USB drives). The outputs of previous training may be provided to the offsite or third party database by manufacturers, retailers, and/or farmers. The training may be performed at a farm implement factory and/or may be performed by the end-user (e.g. farmer or retailer of the implements). In some aspects, the retailer may receive a kit comprising the processing structure that may be affixed to either the power platform 300 or one of the implements.

Although the aspects described above relate to an asymmetric folding implement (e.g. the heavy harrow 102) and a symmetric folding implement (e.g. the land roller 602), the aspects described herein may be equally applicable to other asymmetric and/or symmetric implements, such as for example, tillage equipment (e.g. deep discer, chisel plow, stip till, row cultivator, offset disc, tandem disc, heavy offset dis, subsoiler, field cultivator, rolling cultivator, rotary hoe cultivator), land rollers, rock pickers, stump and/or rock crushers/grinders, mowers (e.g. lawn and/or brush), heavy harrows, grain carts, animal feeders, land leveling equipment (e.g. pull dozer, land leveler), fertilizer applicators (e.g. $NH_3$ fertilizer bander, $NH_3$ fertilizer strip till, granular fertilizer bander, granular fertilizer strip till), manure injector, planters, and/or air seeders.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. An autonomous system for a farm implement comprising:
   a sensor system applied to the farm implement, the farm implement being previously unknown to the autonomous system;
   an imaging sensor capturing image data of the farm implement;
   a control interface to send control signals to a power platform coupled to the farm implement;
   a processing structure executing a plurality of instructions from a tangible computer-readable memory, the instructions comprise:
      capturing sensor data from the sensor system;
      estimating a pose of the farm implement from the image data;
      observing folding or unfolding the farm implement;
      continue receiving the sensor data and the image data and recording the control signals as the power platform substantively folds or unfolds the farm implement by pushing or pulling the farm implement exclusively with movement of the power platform;
      determining at least one control step to fold or unfold the farm implement; and
      subsequently instructing the power platform using the at least one control step to fold or unfold the farm implement.

2. The autonomous system according to claim 1, wherein the sensor system comprises at least one of: a magnetometer, a range sensor, an inertial sensor, a digital switch, an analog potentiometer, a linear position sensor, a rotary position sensor, and any combination thereof.

3. The autonomous system according to claim 2, wherein the range sensor is selected from at least one of: a light detection and ranging (LiDAR) sensor, a radio detection and ranging (radar) sensor, a sound navigation and ranging (sonar) sensor, microphones, and a pair of cameras.

4. The autonomous system according to claim 2, wherein the image sensor comprises a field of view that encompasses the farm implement.

5. The autonomous system according to claim 1, wherein the processing structure comprises at least one of: a general purpose processor, a digital signal processor (DSP), an artificial neural network (ANN), a graphics processing unit (GPU), a field programmable gate array (FPGA), and any combination thereof.

6. The autonomous system according to claim 1, wherein the instructions further comprise: determining a power platform axis and an implement axis; generating an alignment trajectory to generally align the power platform axis with the implement axis; and instructing the power platform to travel along the alignment trajectory.

7. The autonomous system according to claim 1, wherein the instructions further comprise:
   determining at least one obstacle within an initial sensor data; generating an obstacle avoiding trajectory; and instructing the power platform to travel along the obstacle avoiding trajectory.

8. The autonomous system according to claim 1, wherein the pose estimation comprises:
   determining an initial relative position and orientation of at least one wing of the farm implement.

9. The autonomous system according to claim 8, wherein the instructions further comprise:
sending at least one unlock signal to the power platform to unlock one of the at least one wing of the farm implement prior to the power platform traveling along a fold trajectory or an unfold trajectory; and
sending a direction signal to a direction switch to control a direction of an actuator associated with the one or the at least one wing.

10. The autonomous system according to claim 9, wherein the instructions further comprise:
determining a wing angle of the at least one wing of the farm implement from the sensor data; and
stopping the power platform once the wing angle corresponds to a full operation angle or a fully folded angle.

11. The autonomous system according to claim 10, wherein the instructions further comprise:
sending a locking signal to the at least one wing to lock the at least one wing of the farm implement in an operation position or a transport position.

12. The autonomous system according to claim 11, wherein the farm implement folds or unfolds asymmetrically.

13. The autonomous system according to claim 10, wherein the farm implement folds or unfolds symmetrically.

14. An autonomous method for unfolding or folding a farm implement, the method comprises:
applying a sensor system to the farm implement, the farm implement being previously unknown to the autonomous method;
observing a fold or unfold trajectory for a power platform to fold or unfold the farm implement by pushing or pulling the farm implement along the fold or unfold trajectory;
capturing sensor data from the sensor system;
capturing image data from an imaging sensor;
estimating a pose of the farm implement from the image data;
continue receiving the sensor data and the image data and recording at least one control signal to the power platform as the power platform exclusively folds or unfolds the farm implement with movement of the power platform;
determining at least one control step to fold or unfold the farm implement; and
subsequently instructing the power platform using the at least one control step to fold or unfold the farm implement.

15. The autonomous method according to claim 14, further comprises:
detecting the farm implement and estimating at least one boundary of the farm implement.

16. The autonomous method according to claim 15, wherein the at least one boundary is estimated by at least one of: a feature descriptor extraction, a deep learning process, a supervised deep learning process, a motion measurement, an optical flow, a map building, a linear optimization, and a nonlinear optimization.

17. The autonomous method according to claim 14, further comprises:
estimating at least one state of the power platform, the farm implement, and a combination thereof.

18. The autonomous method according to claim 17, wherein the at least one state is determined by at least one of: a geometric process, a Kalman filter, a linear optimization, a nonlinear optimization, and a moving horizon estimation.

19. The autonomous method according to claim 14, further comprises:
generating the fold/unfold trajectory with at least one of: a common trajectory planning, a graph-based search, a search over a configuration space, a grid-based search, an interval-based search, a geometric process, an artificial potential field, a sampling-based process, a linear optimization, a nonlinear optimization, and a probabilistic roadmap.

20. The autonomous method according to claim 14, further comprises:
determining at least one adjustment with at least one of: a Proportional-Derivative-Integral (PID), a Model Predictive Control (MPC), a linear control process, a nonlinear control process, a deep learning process, and a reinforcement learning-based process.

21. The autonomous method according to claim 14, further comprises:
determining a type of the farm implement based on the sensor data.

22. The autonomous method according to claim 21, further comprises:
training a machine learning process using at least one of: the sensor data, an operator input, system inputs, and system outputs to determine the type of the farm implement.

23. The autonomous method according to claim 14, further comprises:
mapping an environment for tracking and localization of at least one of: the farm implement, the power platform, and any obstacle within the environment.

* * * * *